Jan. 19, 1932.  J. K. DIAMOND  1,841,794
BELT COUPLING
Filed Jan. 19, 1931
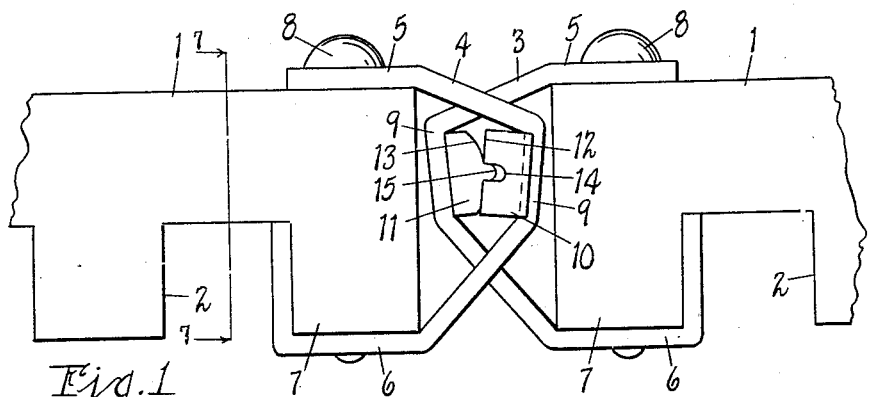
Fig.1
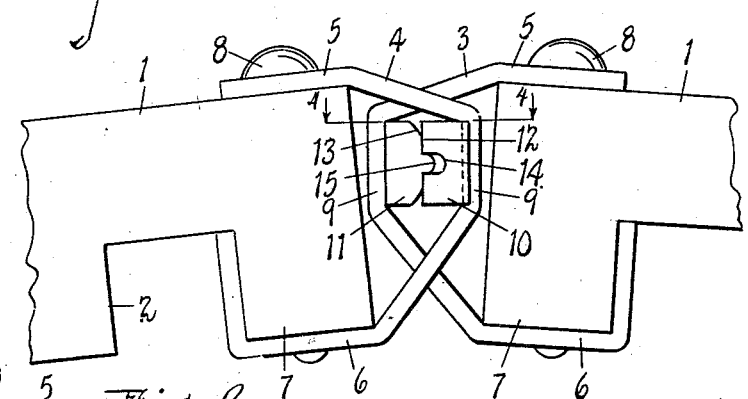
Fig.2
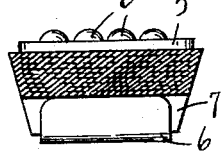
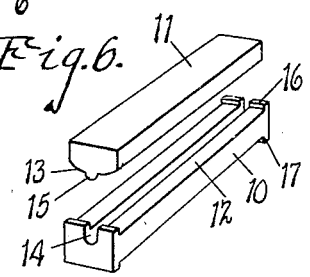
Fig.6.
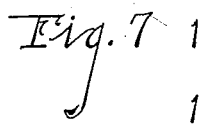
Fig.7
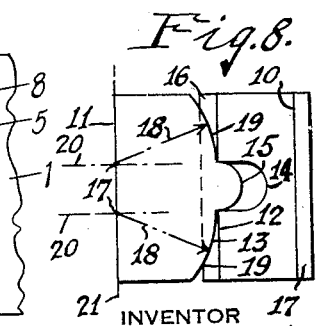
Fig.4
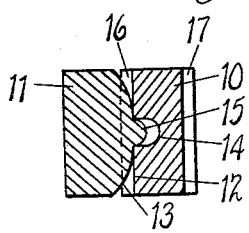
Fig.5
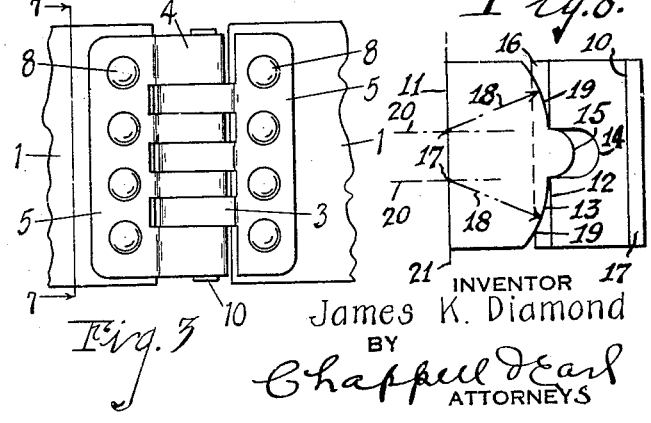
Fig.3
Fig.8.
INVENTOR
James K. Diamond
BY
Chappell & Earl
ATTORNEYS Patented Jan. 19, 1932

1,841,794

UNITED STATES PATENT OFFICE

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN

BELT COUPLING

Application filed January 19, 1931. Serial No. 509,589.

The main objects of this invention are:

First, to provide a belt coupling in which there is a minimum of friction and wear on the coupling pin.

Second, to provide a belt coupling having these advantages which is well adapted for very heavy work and one which may be easily assembled and disassembled.

Objects pertaining to details and economies of my invention will appear from the description to follow. The invention is pointed out in the claims.

A structure which is a preferred embodiment of my invention is illustrated in the accompanying drawings, in which:

Fig. 1 is a fragmentary side elevation of a V belt embodying my improved coupling.

Fig. 2 is a fragmentary side elevation with the belt flexed.

Fig. 3 is a fragmentary plan view.

Fig. 4 is a sectional view on line 4—4 of Fig. 2.

Fig. 5 is a sectional view of the pin on line 5—5 of Fig. 4.

Fig. 6 is a perspective view of the pin members disassembled.

Fig. 7 is a sectional view of a V belt taken on line 7—7 of Figs. 1 and 3.

Fig. 8 is an end elevation of the pin alone, illustrating the construction of the pin members.

In the accompanying drawings 1 represents a V belt, the ends of which are to be coupled, this belt having transverse notches 2 on its inner side. I provide coacting bail-shaped coupling members 3 and 4 which are provided with attaching plates 5 and 6 lapping the ends of the belt, the plate 6 being anchored to engage the first lug 7 of the belt. The plates are secured to the belt by means of the screws or rivets 8.

The coupling members preferably have straight inwardly converging arms connected by straight cross or bight portions 9.

The coupling pin comprises a pair of coacting members 10 and 11 which are of a shape to fit the bight or cross portion and angles of the coupling members so that there is no sliding movement between the pins and the coupling members, the pins swinging or moving with the coupling members. The pin member 10 has a flat bearing face 12 while the pin member 11 has a coacting curved bearing face 13. The member 10 has a longitudinal groove 14 in its bearing face while the member 11 has a longitudinal rib 15 on its face coacting with the groove 14.

The curved bearing face 13 of the coupling member 11 is made up of two curved segments 19 of equal length and radius 18. Their centers 17, however, lie at the intersections between the longitudinal planes 20 which pass through the sides of the tongue 15 and the transverse plane 21 at the base of the member 11. Each of the curved segments 19 has its own center 17 which provides a tangential relation between the flat surface 12 of the member 10 and the surface 13 of the member 11 at all lines of contact therebetween. The initial rolling contact between the surfaces in either direction is at the base of the tongue and the edge of the groove, and a truly rolling action between the surfaces results upon the flexing of the belt ends relative to each other in either direction. In this manner, excessive and non-uniform wear between the bearing surfaces is substantially entirely obviated.

Inwardly projecting lugs 16 at the ends of the bearing face of the member 10 support the member 11 against relative longitudinal movement when the parts are assembled. The member 10 has rearwardly projecting lugs 17 which engage the end coupling members of one set as shown in Fig. 4, supporting the member 10 against longitudinal movement.

With the parts thus arranged there is no frictional or sliding movement of the pin on the coupling members and no material friction or sliding movement of the pin elements, one of these elements rocking on the other.

Improvements in the present invention are described and claimed in co-pending application filed June 23, 1931, Serial No. 546,312.

My improved coupling is very durable and is capable of carrying heavy loads. I have not illustrated or described certain embodiments and adaptations which I contemplate as it is believed that this disclosure will enable those skilled in the art to embody or adapt the same as may be desired.

Having thus described my invention what I claim as new and desire to secure by Letters Patent is:

1. In a belt coupling, the combination of coacting overlapping bail-like coupling members having converging arm portions and straight cross portions, a coupling pin comprising a pair of coacting members in supporting engagement with the cross portions of said coupling members to move therewith, one of said pin members having a flat bearing face with a central longitudinal groove therein, the other having a curved bearing face contacting with said flat bearing face and provided with a central tongue coacting with said groove, said pin member having the flat bearing face being provided with lugs at the end of its bearing face for retaining the coacting pin member and with rearwardly projecting lugs engaging the end coupling members.

2. In a belt coupling, the combination of coacting overlapping bail-like coupling members, a coupling pin comprising a pair of coacting members in supporting engagement with said coupling members to move therewith, one of said pin members having a flat bearing face with a central longitudinal groove therein, the other having a curved bearing face coacting with said flat bearing face and provided with a central tongue coacting with said groove, said pin member having the flat bearing face being provided with lugs at the end of its bearing face for retaining the coacting pin member.

3. In a belt coupling, the combination of coacting overlapping bail-like coupling members having converging arm portions and straight cross portions, a coupling pin comprising a pair of coacting members in supporting engagement with the cross portions of said coupling members to move therewith, one of said pin members having a flat bearing face with a central longitudinal groove therein, the other having a curved bearing face coacting with said flat bearing face and provided with a central tongue coacting with said groove, one of said pin members having rearwardly projecting lugs engaging the end coupling members.

4. In a belt coupling, the combination of coacting overlapping bail-like coupling members, a coupling pin comprising a pair of coacting members in supporting engagement with said coupling members to move therewith, one of said pin members having a flat bearing face with a central longitudinal groove therein, the other having a curved bearing face coacting with said flat bearing face and provided with a central tongue coacting with said groove.

5. In a belt coupling, the combination of coacting overlapping bail-like coupling members having converging arm portions and straight cross portions, a coupling pin comprising a pair of members in supporting engagement with the cross portions of said coupling members to move therewith, one of said pin members having a bearing face with a central longitudinal groove therein, the other having a coacting bearing face provided with a central tongue coacting with said groove, said pin member having the flat bearing face being provided with lugs at the end of its bearing face for retaining the coacting pin member and with rearwardly projecting lugs engaging the end coupling members.

6. In a belt coupling, the combination of coacting overlapping bail-like coupling members, a coupling pin comprising a pair of members in supporting engagement with the cross portions of said coupling members to move therewith, one of said pin members having a bearing face with a central longitudinal groove therein, the other having a coacting bearing face provided with a central tongue coacting with said groove, said pin member having the flat bearing face being provided with lugs at the end of its bearing face for retaining the coacting pin member.

7. In a belt coupling, the combination of coacting overlapping bail-like coupling members having converging arm portions, a coupling pin comprising a pair of members in supporting engagement with the cross portions of said coupling members to move therewith, one of said pin members having a bearing face with a central longitudinal groove therein, and with rearwardly projecting lugs engaging their end coupling members, the other having a coacting bearing face provided with a central tongue coacting with said groove.

8. In a belt coupling, the combination of coacting overlapping bail-like coupling members, a coupling pin comprising a pair of members in supporting engagement with the cross portions of said coupling members to move therewith, one of said pin members having a bearing face with a central longitudinal groove therein, the other having a coacting bearing face provided with a central tongue coacting with said groove, one of said pin members having end lugs for retaining it and the other pin member in position relative to said coupling members.

9. In a belt coupling, the combination of coacting overlapping bail-like coupling members having converging arm portions and straight cross portions, a coupling pin comprising a pair of coacting members in supporting engagement with the cross portions of said coupling members to move therewith, one of said pin members having a flat bearing face with a central longitudinal groove therein, the other having a curved bearing face contacting with said flat bearing face and provided with a central tongue coacting with said groove, said curved surface having a plurality of centers of curvature, said centers of curvature being at the intersections between a transverse plane at the base of the coupling member and longitudinal planes passing through the sides of the base of said tongue.

10. In a belt coupling, the combination of coacting bail-like coupling members, a coupling pin comprising a pair of coacting members in supporting engagement with said coupling members to move therewith, one of said pin members having a flat bearing face with a central longitudinal groove therein, the other having a curved bearing face coacting with said flat bearing face and provided with a central tongue coacting with said groove, said curved surface having two centers of curvature, said centers of curvature being at the intersections between a transverse plane and longitudinal planes passing through the sides of the base of said tongue.

In witness whereof I have hereunto set my hand.

JAMES K. DIAMOND.